US012394293B2

(12) United States Patent
Sandler

(10) Patent No.: US 12,394,293 B2
(45) **Date of Patent: *Aug. 19, 2025**

(54) LIFE SAFETY DEVICE WITH MACHINE LEARNING BASED ANALYTICS

(71) Applicant: The ADT Security Corporation, Boca Raton, FL (US)

(72) Inventor: Ryan Nathanial Sandler, Santee, CA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,274

(22) Filed: Mar. 8, 2024

(65) Prior Publication Data

US 2024/0212469 A1 Jun. 27, 2024

Related U.S. Application Data

(63) Continuation of application No. 17/845,743, filed on Jun. 21, 2022, now Pat. No. 11,961,381.

(51) Int. Cl.
*G08B 17/117* (2006.01)
*G08B 29/18* (2006.01)

(52) U.S. Cl.
CPC .......... *G08B 17/117* (2013.01); *G08B 29/186* (2013.01)

(58) Field of Classification Search
CPC ........... G08B 21/12; G01N 2015/0046; G01N 1/2273; G01N 2015/03; G01N 33/0067
See application file for complete search history.

(56) References Cited

U.S. PATENT DOCUMENTS

| | | | | |
|---|---|---|---|---|
| 6,078,050 | A * | 6/2000 | Castleman | G08B 25/002 250/342 |
| 7,142,105 | B2 | 11/2006 | Chen | |
| 7,170,418 | B2 | 1/2007 | Rose-Pehrsson et al. | |
| 8,077,046 | B1 | 12/2011 | Wong | |
| 9,677,986 | B1 * | 6/2017 | Baldwin | G01S 7/481 |
| 9,752,436 | B2 | 9/2017 | Pavetic et al. | |
| 9,990,824 | B2 | 6/2018 | Rao et al. | |
| 10,429,289 | B2 | 10/2019 | Knox et al. | |
| 11,468,761 | B1 * | 10/2022 | Antar | H04N 7/183 |
| 2014/0028803 | A1 | 1/2014 | Hanses et al. | |
| 2017/0169683 | A1 | 6/2017 | Ryder | |
| 2018/0266933 | A1 * | 9/2018 | Tamraz | G01N 35/00871 |
| 2022/0026334 | A1 * | 1/2022 | Tamraz | G01N 1/2273 |

* cited by examiner

*Primary Examiner* — Mirza F Alam
(74) *Attorney, Agent, or Firm* — Weisberg I.P. Law, P.A.

(57) ABSTRACT

A detector is provided. The detector includes a sensor configured to detect airborne particulates at a premises and processing circuitry. The processing circuitry is configured to determine a characteristic associated with the detected airborne particulates, compare the characteristic associated with the detected airborne particles to data associated with predefined characteristics of burned materials, detect, based at least on the comparison, presence of a fire; and determine, if the presence of the fire is detected, a characteristic of the fire based on the characteristic associated with the detected airborne particles and the comparison.

20 Claims, 4 Drawing Sheets

LIFE SAFETY DEVICE WITH MACHINE LEARNING BASED ANALYTICS

CROSS-REFERENCE TO RELATED PATENT APPLICATION

This application is a continuation of and claims priority to U.S. Utility patent application Ser. No. 17/845,743, filed on Jun. 21, 2022, entitled LIFE SAFETY DEVICE WITH MACHINE LEARNING BASED ANALYTICS, the entirety of which is incorporated herein by reference.

FIELD

This disclosure relates in general to detection of an alarm condition at a premises, and in particular determining characteristics associated with detected airborne particulates.

BACKGROUND

Some existing premises fire detection system rely on smoke detectors that generally use one of two methods for detecting smoke. The first, used by ionization smoke detectors, uses a small amount of radioactive material to ionize air between two conductive plates. The ionized air allows current to pass between the plates. If the space between the plates becomes obstructed by smoke, the current is disrupted. The disruption is detected by circuitry, which sounds an alarm. The second method, used by photoelectric smoke detectors, aims light away from a sensor within a chamber. When smoke enters the chamber, it reflects a portion of the light toward the sensor. Processing circuitry in communication with the sensor then sounds an alarm.

When fire occurs at a premises, smoke within a premises negatively impacts visibility. This impact is particularly potent when an occupant is unfamiliar with the premises or the route for egress involves small enclosures with short travel distances. Heat from the fire raises the temperature. As the temperature within the premises rises, the exposure time before an occupant suffers hyperthermia, body surface burns, respiratory tract burns, or other ailments drops rapidly. Toxins, including particulates and gasses, can be byproducts of the fire and can build up in the air within the premises, causing an occupant to suffer from, e.g., cardiac arrest, shortness of breath, and disorientation. As the fire consumes oxygen, the oxygen saturation level can drop as well, making it more difficult for an occupant to breathe.

However, the aforementioned conditions within the premises are not homogenous, i.e. within the premises visibility, temperature, toxic conditions, and oxygen saturation can vary based on the location relative to the fire. It follows, then, that the conditions will vary along and among routes for ingress or egress. Moreover, the nature of the fire, including spread rate, spread pattern, temperature, and amount and nature of toxicity, can vary depending on the fuel source. For example, the nature of a lithium fire in a premises associated with solar energy storage will differ from other fire occurrences. Hence, existing fire alarm systems that monitor for an alarm condition within a premises based on whether a predefined threshold may fail to adequately analyze a fire condition.

SUMMARY

The techniques of this disclosure generally relate to detection of a fire at a premises, and in particular comparing characteristics associated with detected airborne particulates to data associated with predefined characteristics of burned materials. A detector in accordance with the present disclosure may provide for earlier and more reliable detection of fire events while reducing or eliminating false alarms, as compared to more traditional detectors.

According to one aspect of the invention, the present disclosure provides a detector. The detector has at least one sensor configured to detect airborne particulates at a premises. The detector further has processing circuitry. The processing circuitry is configured to determine at least one characteristic associated with the detected airborne particulates. The processing circuitry compares the at least one characteristic associated with the detected airborne particles to data associated with predefined characteristics of burned materials. Based on the comparison, the processing circuitry detects whether a fire is present at the premises. If the presence of the fire is detected, the processing circuitry determines at least one characteristic of the fire based on the at least one characteristic associated with the detected airborne particles and the comparison.

According to some embodiments of this aspect, the processing circuitry is further configured to determine, based on the at least one characteristic of the fire, at least one fire response characteristic. The fire response characteristic includes at least one of an egress point and an ingress point. The egress point may be for, by way of example, occupants of the premises to safely exit the premises. The ingress point may be for, by way of example, emergency response personnel to safely enter the premises. According to some embodiments of this aspect, the processing circuitry is configured to indicate an aspect of the fire response characteristic. For example, the processing circuitry may transmit an alarm that indicates an egress or ingress point, which may assist to guide occupants or emergency response personnel. According to some embodiments of this aspect, the processing circuitry is further configured to determine a condition at the premises. According to some embodiments of this aspect, based on at least one characteristic associated with the detected airborne particulates, the condition may be a visibility condition. According to some embodiments of this aspect, the condition may be temperature. According to some embodiments of this aspect, the at least one characteristic of the fire includes at least one of burn rate, spread pattern, and an identity of a substance that is burning.

According to some embodiments of this aspect, the sensor is configured to detect gas at the premises. The processing circuitry is further configured to determine at least one characteristic associated with the detected gas. By way of non-limiting example, the characteristic of the detected gas may be a gas level for at least one of CO, CO2, NCH, HCl, NO2, and O2. According to some embodiments of this aspect, the at least one characteristic of the fire comprises burn rate. According to some embodiments of this aspect, the at least one characteristic of the fire comprises the fire's spread pattern. According to some embodiments of this aspect, the at least one characteristic of the fire comprises an identity of a substance that is burning. According to some embodiments of this aspect, the processing circuitry is further configured to transmit an alarm signal where the alarm signal includes an indication of a fire response characteristic comprising one of an egress point and an ingress point.

According to some embodiments of this aspect, the predefined characteristics of burned materials comprises at least one of smoke yield, smoke composition, soot yield, and soot composition. According to some embodiments of this aspect, the processing circuitry is further configured to request data specific to the detected airborne particulates from a database to retrieve the predefined characteristics of burned materials.

According to some embodiments of this aspect, the processing circuitry is further configured to train a model to determine the characteristic of the fire using machine learning.

In another aspect of the present invention, the present disclosure provides a method implemented by a detector is provided. Airborne particles at a premises are detected. At least one characteristic associated with the detected airborne particulates is determined. The at least one characteristic associated with the detected airborne particulates is compared to data associated with predefined characteristics of burned materials. The processing circuitry detects, based at least on the comparison, a presence of a fire. If the presence of the fire is detected, at least one characteristic of the fire is determined based on the at least one characteristic associated with the detected airborne particles and the comparison.

According to some embodiments of this aspect, based on the at least one characteristic of the fire, at least one fire response characteristic is determined. The fire response characteristic includes at least one of an egress point and an ingress point. According to some embodiments of this aspect, an aspect of the fire response characteristic is indicated. For example, the processing circuitry may transmit an alarm that indicates an egress or ingress point, which may assist to guide occupants or emergency response personnel. According to some embodiments of this aspect, a condition at the premises is determined. In at least one aspect, based on at least one characteristic associated with the detected airborne particulates, the condition may be a visibility condition. According to some embodiments of this aspect, the condition may be temperature.

According to some embodiments of this aspect, information is received from the at least one sensor where the information pertains to a detected gas at the premises, and determines at least one characteristic associated with the detected gas. According to some embodiments of this aspect, the characteristic of the detected gas a gas level for at least one of CO, CO2, NCH, HCl, NO2, and O2. According to some embodiments of this aspect, the at least one characteristic of the fire includes burn rate. According to some embodiments of this aspect, the at least one characteristic of the fire includes spread pattern. According to some embodiments of this aspect, the at least one characteristic of the fire includes identity of a substance that is burning. In another aspect, an alarm signal is transmitted where the alarm signal includes an indication of a fire response characteristic including one of an egress point and ingress point.

According to some embodiments of this aspect, the predefined characteristics of burned materials includes at least one of smoke yield, smoke composition, soot yield, and soot composition. According to some embodiments of this aspect, data specific to the detected airborne particulates is requested from a database to retrieve the predefined characteristics of burned materials. According to some embodiments of this aspect, a model is trained to determine the characteristic of the fire using machine learning. According to some embodiments of this aspect, the at least one characteristic of the fire includes at least one of burn rate, spread pattern, and an identity of a substance that is burning.

According to another aspect of the present invention, a detector is provided. The detector includes at least one sensor configured to detect airborne particulates at a premises, and processing circuitry. The processing circuitry is configured to determine at least one characteristic associated with the detected airborne particulates, request data specific to the detected airborne particulates from a database to retrieve predefined characteristics of burned materials, compare the at least one characteristic associated with the detected airborne particles to the predefined characteristics of burned materials, detect, based at least on the comparison, a presence of a fire, determine, if the presence of the fire is detected, at least one characteristic of the fire based on the at least one characteristic associated with the detected airborne particles and the comparison; and train a model to determine the characteristic of the fire using machine learning.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
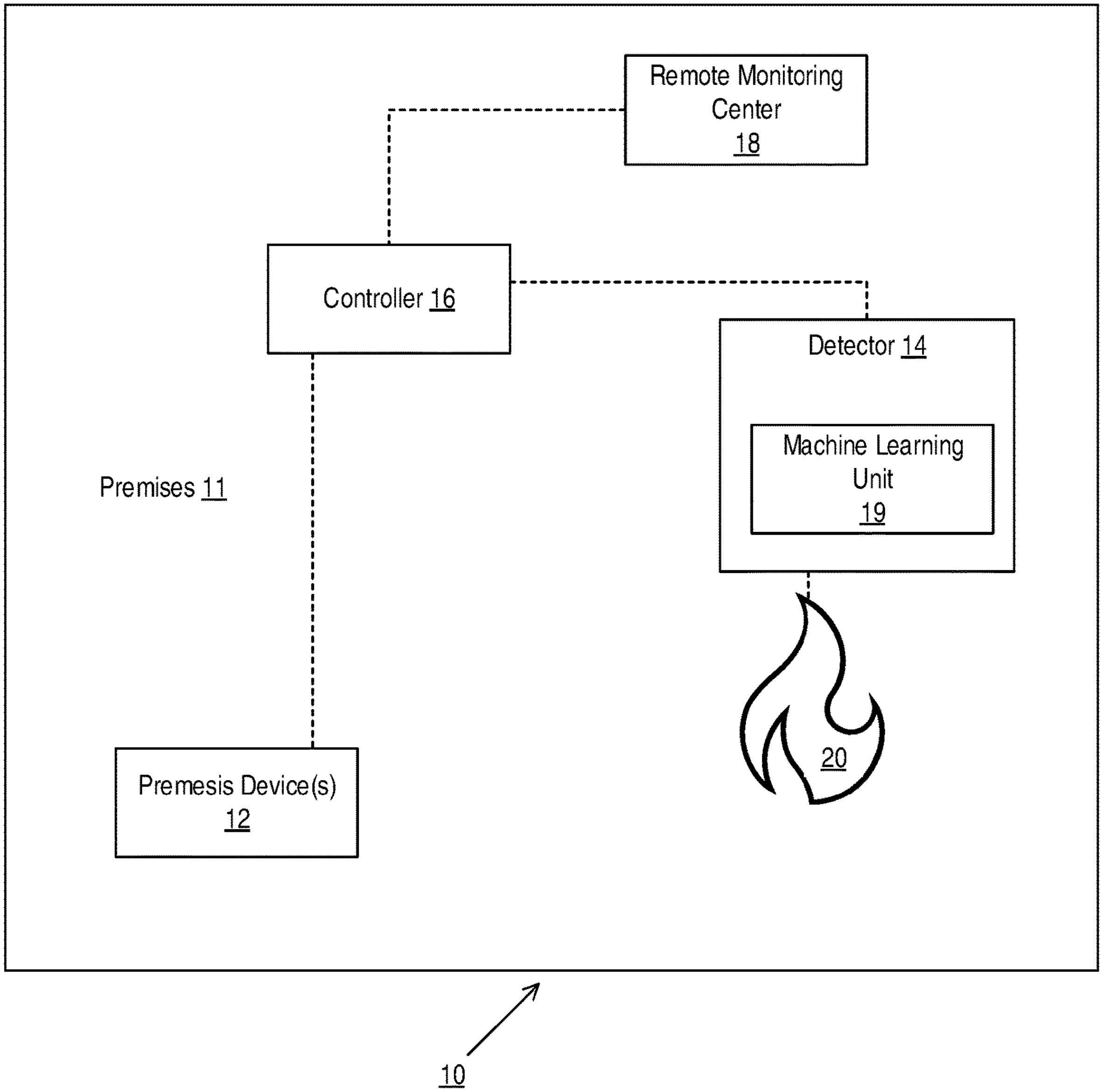
FIG. 1 is a schematic diagram of a system according to the present invention.

Before describing in detail exemplary embodiments, it is noted that the embodiments reside primarily in combinations of apparatus components and processing steps related to detection of an alarm condition at a premises, and in particular determining characteristics associated with detected airborne particulates. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to drawing figures in which like reference designators refer to like elements, there is shown in FIG. 1 an example system for detection of an alarm condition at a premises, and in particular determining characteristics associated with detected airborne particulates in accordance with the principles of the invention and designated generally as "10." System 10 may be associated with premises 11 and may include one or more premises devices 12 (collectively referred to as premises device 12) for monitoring a premises, one or more detectors 14 (collectively referred to as detector 14) for performing life safety detections using analytics as described herein, a control unit 16 (also referred to as controller 16) in communication with one or more of the premises devices 12, detector 14 and remote monitoring center 18.

Premises device 12 may include one or more types of sensors, control and/or image capture devices. For example, the types of sensors may include various safety related sensors such as motion sensors, fire sensors, carbon monoxide sensors, flooding sensors and contact sensors, among other sensor types that are known in the art. The control devices may include, for example, one or more life style related devices configured to adjust at least one premises setting such as lighting, temperature, energy usage, door lock and power settings, among other settings associated with the premises or devices on the premises. Image capture devices may include a digital camera and/or video camera, among other image captures devices that are well known in the art. Detector 14 may communicate with control unit 16 via proprietary wireless communication protocols and may also use Wi-Fi, both of which are known in the art. Other communication technologies can also be used, and the use of Wi-Fi is merely for example. Those of ordinary skill in the art will also appreciate that various additional sensors and control and/or image capture devices may relate to life safety or life style depending on both what the sensors, control and image capture devices do and how these sensors, control and image devices are used by system 10.

Detector 14 may correspond to an artificial intelligence (AI) based detector that is configured to provide one or more functions described herein. Detector 14 may be in communication with one or more networks for communicating with remote monitoring center 18, one or more databases and/or one or more servers. Detector 14 includes machine learning unit 19 that is configured to perform one or more detector 14 functions as described herein such as with respect to AI based alarm condition analysis and/or alarm triggering. For example, detector 14 may analyze conditions associated with fire 20.

Control unit 16 may provide management functions such as power management, premises device management and alarm management, among other functions. In particular, control unit 16 may manage one or more life safety and life style features. Life safety features may correspond to security system functions and settings associated with premises conditions that may result in life threatening harm to a person such as carbon monoxide detection and intrusion detection. Life style features may correspond to security system functions and settings associated with video capturing devices and non-life-threatening conditions of the premises such as lighting and thermostat functions.

Control unit 16 may communicate with one or more network via one or more communication links. In particular, the communications links may be broadband communication links such as a wired cable modem or Ethernet communication link, and digital cellular communication link, e.g., long term evolution (LTE) and/or New Radio (NR) based link, among other broadband communication links known in the art. Broadband as used herein may refer to a communication link other than a plain old telephone service (POTS) line. Ethernet communication link may be an IEEE 802.3 or 802.11 based communication link. The network may be a wide area network, local area network, wireless local network and metropolitan area network, among other networks known in the art. The network provides communications between one or more of control unit 16, remote monitoring center 18 and database(s).

Figure 2:
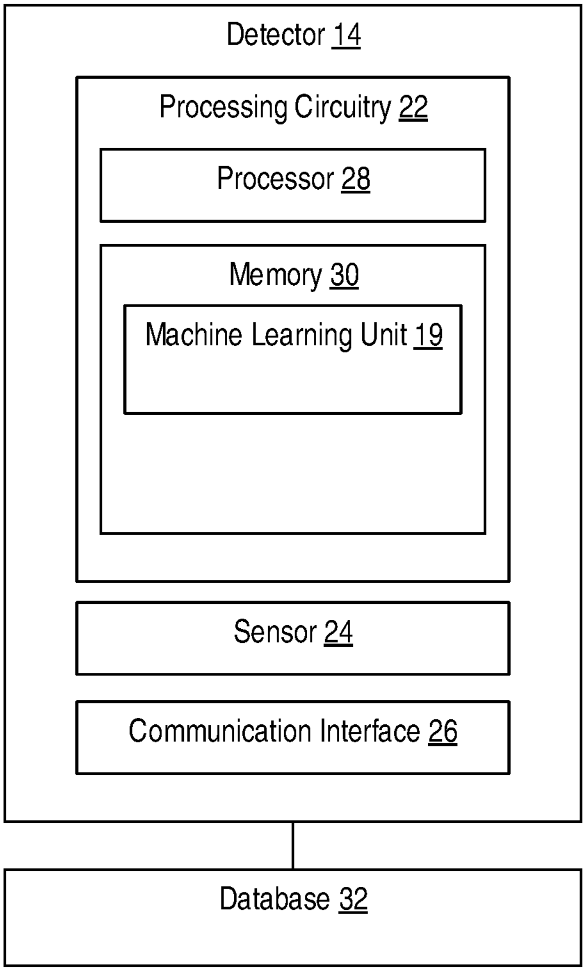
FIG. 2 is a block diagram of several elements of the system according to some embodiments disclosed herein.

Example implementations, in accordance with one or more embodiments, of detector 14 discussed in the preceding paragraphs will now be described with reference to FIG. 2.

The detector 14 includes processing circuitry 22, a sensor 24, and a communication interface 26. The processing circuitry 22 may include a processor 28 and a memory 30. In particular, in addition to or instead of a processor, such as a central processing unit, and memory, the processing circuitry 22 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 28 may be configured to access (e.g., write to and/or read from) the memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the detector 14 further has software stored internally in, for example, memory 30, or stored in external memory (e.g., database, storage array, network storage device, etc.) accessible by the detector 14 via an external connection. The software may be executable by the processing circuitry 22. The processing circuitry 22 may be configured to control any of the methods and/or processes described herein and/or to cause such methods, and/or processes to be performed, e.g., by detector 14. Processor 28 corresponds to one or more processors 28 for performing detector 14 functions described herein. The memory 30 is configured to store data, programmatic software code and/or other information described herein. In some embodiments, the software may include instructions that, when executed by the processor 28 and/or processing circuitry 22, causes the processor 28 and/or processing circuitry 22 to perform the processes described herein with respect to detector 14. For example, processing circuitry 22 of the detector 14 may include machine learning unit 19 which is configured to perform one or more functions described herein such as with respect to AI based alarm triggering. In particular, machine learning unit 19 is trained based on the processes and methods disclosed herein. Thus, the detector 14 may learn how to more accurately and quickly detect a fire 20 and determine an appropriate response (as compared with known solutions). For example, deployment of the detector 14 on the premises 11 allows the detector 14 to gather information regarding typical, expected environmental conditions on the premises 11. This may include, for example, normal and expected deviations of the environmental conditions that do not indicate presence of a fire or warrant an alert. The machine learning unit 19 thereby learns what conditions are normal, and can more readily and accurately identify environmental conditions that fall outside normal conditions. This leads to more accurate detection with fewer false positives.

For example, the detector 14 detects the presence of a fire 20 within the premises 11. In at least one embodiment, the detector 14 indicates to occupants a safe egress point and indicates to emergency response personnel a safe ingress point. In at least one embodiment, the detector 14 additionally indicates a path for ingress and egress. In doing so, the detector 14 accounts for characteristics of the fire, including location, spread rate, and spread pattern, as further described herein.

The detector 14 communicates via the communication interface 26 which may wirelessly communicate with one or more devices on an existing local area network (such as via a home or commercial Wi-Fi router) and/or via Bluetooth, ZigBee, or Zwave, or may instead or additionally communicate by wire. The detector 14 accordingly may be in communication, either directly or indirectly, with devices including but not limited to other detectors (including detectors in accordance with the present disclosure), external alarms, external displays, and local or remote databases.

In at least one embodiment, detector 14 includes one or more sensors 24 (collectively referred to as sensor 24) that are configured to detect airborne particulates at the premises 11, such as soot (often but not necessarily referring to carbonaceous particulates produced from incomplete combustion) and smoke (often but not necessarily referring to byproducts of combustion). The sensor 24 may additionally be configured to detect at least one gas at the premises 11, which may be a byproduct of combustion. The gas may be, for example, at least one of CO, CO2, NCH, HCl, NO2, and O2, although sensor 24 may be configured to detect one or more other gases or fluids. In at least one embodiment, the sensor 24 can detect the temperature at the premises 11 and/or of the fire 20. In at least one embodiment, the sensor 24 can detect at least one of volatile organic compounds (VOCs), bacteria, and viruses. For example, sensor 24 may detect one or more characteristics associated with VOCs, bacteria and/or a virus based at least on airborne particulates where the detector 14 is configured to access a database of known signatures (e.g., VOC signatures, bacteria signatures, virus signatures) to compare the detected one or more characteristics (e.g., molecular structure of particulate) with the known signatures. Based at least on the comparison, the detector 14 is able to trigger some action. Examples of such actions are described herein. Therefore, in one or more embodiments, detector 14 may be configured with various sensors 24 for performing separate detections of airborne particulates, i.e., sensor 24*a* detects airborne particulates for fire related determinations while sensor 24*b* detects airborne particulates for VOC related determinations, etc.

In at least one embodiment, the detector 14 may provide various information to emergency response personnel. The information includes one or more environmental conditions before, during, and after an alert, as compared to the expected environmental conditions. This information is additionally shared with any stakeholders, including but not limited to any control systems or monitoring systems. In another example, the information provided by the detector 14 may indicate that it is unsafe for first responders to enter the premises/building based on one or more determined characteristics associated with the detected airborne particles.

Figure 3:
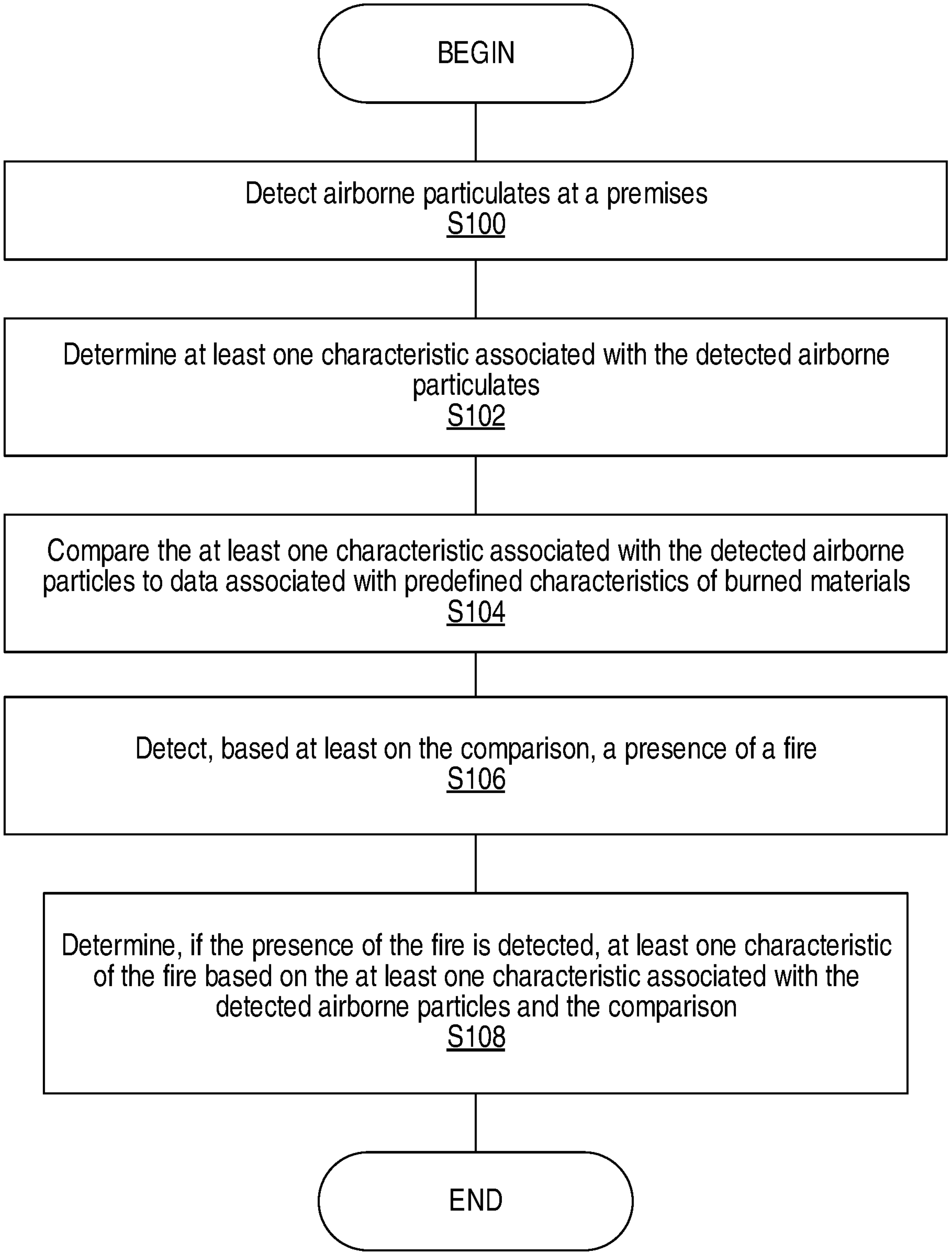
FIG. 3 is a flowchart of an example process implemented by detector according to at least one embodiment disclosed herein.

FIG. 3 is a flowchart of an example process in a detector according to some embodiment of the present invention. One or more blocks described herein may be performed by one or more elements of detector 14 such as by one or more of processing circuitry 36 (including the machine learning unit 19), processor 38, etc. Detector 14 is configured to detect (Block S100) airborne particulates at a premises. Detector 14 is configured to determine (Block S102) at least one characteristic associated with the detected airborne particulates. Detector 14 is configured to compare (Block S104) the at least one characteristic associated with the detected airborne particles to data associated with predefined characteristics of burned materials.

Detector 14 is configured to detect (Block S106), based at least on the comparison, a presence of a fire 20. Detector 14 is configured to determine (Block S108), if the presence of the fire 20 is detected, at least one characteristic of the fire 20 based on the at least one characteristic associated with the detected airborne particles and the comparison.

According to some embodiments, the detector 14 is configured to determine, based on the at least one characteristic of the fire 20, at least one fire response characteristic. According to some embodiments, the fire response characteristic includes at least one of an egress point and an ingress point. According to some embodiments, the detector 14 is configured to determine, based on the at least one characteristic associated with the detected airborne particulates, a visibility condition.

According to some embodiments, the detector 14 is configured to detect gas at the premises, and the processing circuitry 22 is configured to determine at least one characteristic associated with the detected gas. According to some embodiments, the characteristic of the detected gas is a gas level for at least one of CO, CO2, NCH, HCl, NO2, and O2. According to some embodiments, at least one characteristic of the fire comprises burn rate. According to some embodiments, the at least one characteristic of the fire includes at least one of burn rate, spread pattern, and an identity of a substance that is burning.

According to some embodiments, the characteristic of the fire includes spread pattern. According to some embodiments, the characteristic of the fire comprises an identity of a substance that is burning. According to some embodiments, the processing circuitry 22 is configured to transmit an alarm signal where the alarm signal includes an indication of a fire response characteristic including one of an egress point and an ingress point. According to some embodiments, the predefined characteristics of burned materials includes at least one of smoke yield, smoke composition, soot yield, and soot composition.

According to some embodiments, the processing circuitry 22 is configured to request data specific to the detected airborne particulates from a database to retrieve the predefined characteristics of burned materials. According to some embodiments, the processing circuitry 22 is configured to train a model to determine the characteristic of the fire 20 using machine learning.

Figure 4:
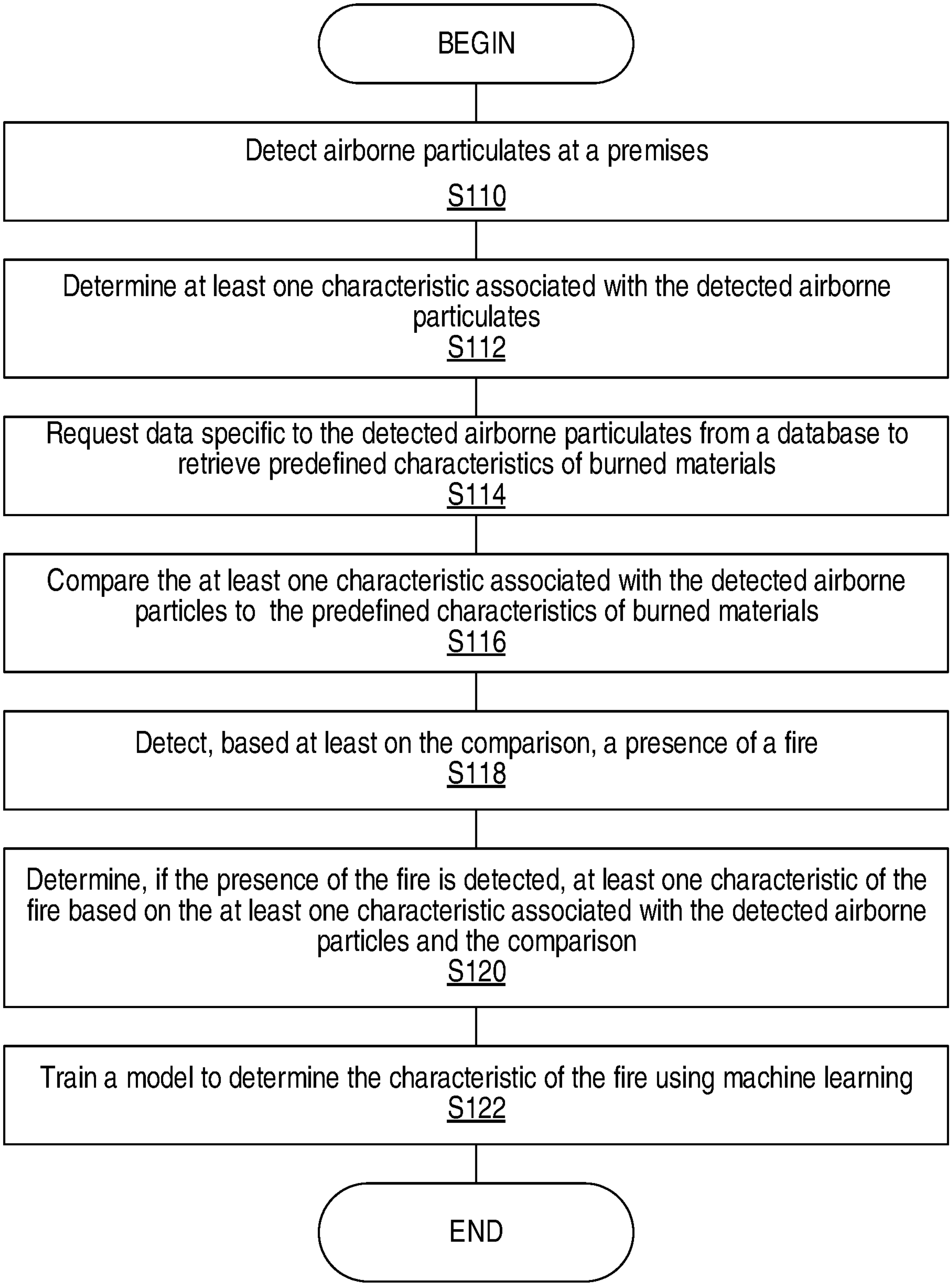
FIG. 4 is a flowchart of an example process implemented by detector according to at least one embodiment disclosed herein.

FIG. 4 is a flowchart of an example process in a detector according to some embodiment of the present invention. One or more blocks described herein may be performed by one or more elements of detector 14 such as by one or more of processing circuitry 36 (including the machine learning unit 19), processor 28, etc. Detector 14 includes at least one sensor that is configured to detect (Block S110) airborne particulates at a premises 11. Detector 14 is configured to determine (Block S112) at least one characteristic associated with the detected airborne particulates. Detector 14 is configured to request (Block S114) data specific to the detected airborne particulates from a database 32 to retrieve predefined characteristics of burned materials. Detector 14 is configured to compare (Block S116) the at least one characteristic associated with the detected airborne particles to the predefined characteristics of burned materials.

Detector 14 is configured to detect (Block S118), based at least on the comparison, a presence of a fire 20. Detector 14 is configured to determine (Block S120), if the presence of the fire 20 is detected, at least one characteristic of the fire 20 based on the at least one characteristic associated with the detected airborne particles and the comparison. Detector 14 is configured to train (Block S122) a model to determine the characteristic of the fire using machine learning.

According to some embodiments, the detector 14 is configured to determine, based on the at least one characteristic of the fire 20, at least one fire response characteristic. According to some embodiments, the fire response characteristic includes at least one of an egress point and an ingress point. According to some embodiments, the detector 14 is configured to determine, based on the at least one characteristic associated with the detected airborne particulates, a visibility condition.

According to some embodiments, the detector 14 is configured to detect gas at the premises 11, and the processing circuitry 22 is configured to determine at least one characteristic associated with the detected gas. According to some embodiments, the characteristic of the detected gas is a gas level for at least one of CO, CO2, NCH, HCl, NO2, and O2. According to some embodiments, at least one characteristic of the fire 20 includes a burn rate. According to some embodiments, the characteristic of the fire 20 includes a spread pattern. According to some embodiments, the at least one characteristic of the fire includes at least one of burn rate, spread pattern, and an identity of a substance that is burning.

According to some embodiments, the characteristic of the fire 20 includes an identity of a substance that is burning. According to some embodiments, the processing circuitry 22 is configured to transmit an alarm signal where the alarm signal includes an indication of a fire 20 response characteristic including one of an egress point and an ingress point. According to some embodiments, the predefined characteristics of burned materials comprises at least one of smoke yield, smoke composition, soot yield, and soot composition.

In some embodiments by way of non-limiting example, the predefined characteristics of burned materials includes known yields from the combustion of various fuel sources. The yields may include smoke yield, smoke composition, soot yield, and soot composition.

In some embodiments, if fire 20 is detected, then a characteristic of the fire 20 based on the characteristic associated with the detected airborne particles and the comparison is determined by the detector 14. The characteristic of the fire 20 may vary depending on, for example, inherent and environmental factors. Inherent factors include the fuel source. Environmental factors include location of the fire on the premises. The determined characteristic may include one of the fire 20's burn rate, spread pattern, and a fuel source (i.e., at least one substance that is burning).

In some embodiments, based on information received from the sensor 24, the processing circuitry 22 determines at least one condition at the premises 11. In the case where the sensor 24 detects airborne particulates, the processing circuitry 22 determines at least one characteristic of the airborne particulates. Other examples of characteristics of the airborne particulates determined in the various embodiments include the composition of the particulates.

Further, detector 14 compares at least one characteristic of the detected airborne particulates with predefined characteristics of burned materials. By way of non-limiting example, the predefined characteristics of burned materials includes known yields from the combustion of various fuel sources. The yields may include smoke yield, smoke composition, soot yield, and soot composition. In at least one embodiment, the processing circuitry 22 requests the predefined characteristics of burned materials from a database 32. The database 32 may be on a local network or may be remote. The request may be performed using the communication interface 26.

In some embodiments, characteristics of the fire 20 may vary depending on, for example, inherent and environmental factors. Inherent factors include the fuel source. Environmental factors include location of the fire 20 on the premises 11.

In the various embodiments, the determined characteristic may include one of the fire 20's burn rate, spread pattern, and a fuel source (i.e., at least one substance that is burning).

In some embodiments, the ingress and/or egress point may be indicated by transmission by the processing circuitry 22 of an alarm signal. The alarm signal may result in an auditory alarm, such as a siren or verbal announcement, or a visual alarm, such as a light pattern or indicia on signage or a display.

In at least one embodiment, the processing circuitry 22 accounts for various characteristics of the premises 11, including structural features such as layout of interior and exterior spaces. The processing circuitry 22 additionally accounts for the characteristics of the fire 20, such as location within the premises 11 and speed and pattern of spread. Accordingly, the processing circuitry 22 can then determine a fire 20 response characteristic that includes a path through the premises 11 for occupants to safely exit.

Additionally or alternatively, the processing circuitry 22 may determine a point of ingress for emergency response personnel to enter the premises 11 to, for example, address the fire 20 or attend to occupants.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A detector, comprising:

at least one sensor configured to detect airborne particulates at a premises;

at least one processor in communication with the at least one sensor;

at least one memory storing instructions that, when executed by the at least one processor, cause the at least one processor to:

determine at least one characteristic associated with the airborne particulates, the at least one characteristic associated with the airborne particulates comprising a composition of the airborne particulates;

compare the at least one characteristic associated with the airborne particulates to data associated with predefined characteristics of reference particulates;

detect, based at least on a result of the comparison, a presence of an alarm condition; and determine, in response to the presence of the alarm condition being detected, at least one characteristic of the alarm condition based at least on the at least one characteristic associated with the airborne particulates and the result of the comparison, the at least one characteristic of the alarm condition comprising an identity of a substance that is a source of the airborne particulates; and indicate an egress point or an ingress point based on the at least one characteristic of the alarm condition.

2. The detector of claim 1, wherein the at least one characteristic associated with the airborne particulates further comprises at least one of a spread pattern or a burn rate.

3. The detector of claim 1, wherein the instructions are further configured to cause the at least one processor to determine, based on the at least one characteristic associated with the airborne particulates, a visibility condition at the premises.

4. The detector of claim 1, wherein the airborne particulates correspond to a detected gas.

5. The detector of claim 4, wherein the detected gas comprises at least one of carbon monoxide (CO), carbon dioxide (CO2), nitrogen dioxide (NCH), hydrochloric acid (HCL), nitrogen dioxide (NO2), or oxygen (O2).

6. The detector of claim 4, wherein the at least one characteristic associated with the detected gas further comprises a burn rate of the detected gas.

7. The detector of claim 6, wherein the at least one characteristic associated with the detected gas further comprises a gas level.

8. The detector of claim 7, wherein the instructions are further configured to cause the at least one processor to transmit an alarm signal based at least on at least one of the burn rate of the detected gas or the gas level.

9. The detector of claim 1, wherein the instructions are further configured to cause the at least one processor to obtain the data associated with the predefined characteristics of the reference particulates from a remote database.

10. The detector of claim 1, wherein the sensor is further configured to detect at least one of volatile organic compounds or bacteria.

11. The detector of claim 1, wherein the sensor is further configured to detect viruses.

12. The detector of claim 1, wherein the airborne particulates are at least one of volatile organic compounds, bacteria, or viruses; and the instructions are further configured to cause the at least one processor to request data specific to the at least one of volatile organic compounds, bacteria, or viruses from a database.

13. The detector of claim 1, wherein the instructions are further configured to cause the at least one processor to apply a machine learning model to determine the at least one characteristic associated with the airborne particulates.

14. A method implemented by a detector, the detector comprising at least one sensor configured to detect airborne particulates at a premises, the method comprising:

determining at least one characteristic associated with the airborne particulates, the at least one characteristic associated with the airborne particulates comprising a composition of the airborne particulates;

comparing the at least one characteristic associated with the airborne particulates to data associated with predefined characteristics of reference particulates;

detecting, based at least on a result of the comparison, a presence of an alarm condition; and determining, in response to the presence of the alarm condition being detected, at least one characteristic of the alarm condition based at least on the at least one characteristic associated with the airborne particulates and the result of the comparison, the at least one characteristic of the alarm condition comprising an identity of a substance that is a source of the airborne particulates; and indicating an egress point or an ingress point based on the at least one characteristic of the alarm condition.

15. The method of claim 14, where the at least one characteristic associated with the airborne particulates further comprises at least one of a spread pattern or a burn rate.

16. The method of claim 14, further comprising determining, based on the at least one characteristic associated with the airborne particulates, a visibility condition at the premises.

17. The method of claim 14, wherein the airborne particulates correspond to a detected gas; and the at least one characteristic associated with the detected gas further comprises at least one of a burn rate of the detected gas or a gas level.

18. The method of claim 17, further comprising transmitting an alarm signal based at least on at least one of the burn rate of the detected gas or the gas level.

19. The method of claim 14, wherein the sensor is further configured to detect at least one of volatile organic compounds or bacteria.

20. The method of claim 17, wherein the airborne particulates are at least one of volatile organic compounds, bacteria, or viruses; and the method further comprising requesting data specific to the at least one of volatile organic compounds, bacteria, or viruses from a database.

* * * * *